UNITED STATES PATENT OFFICE.

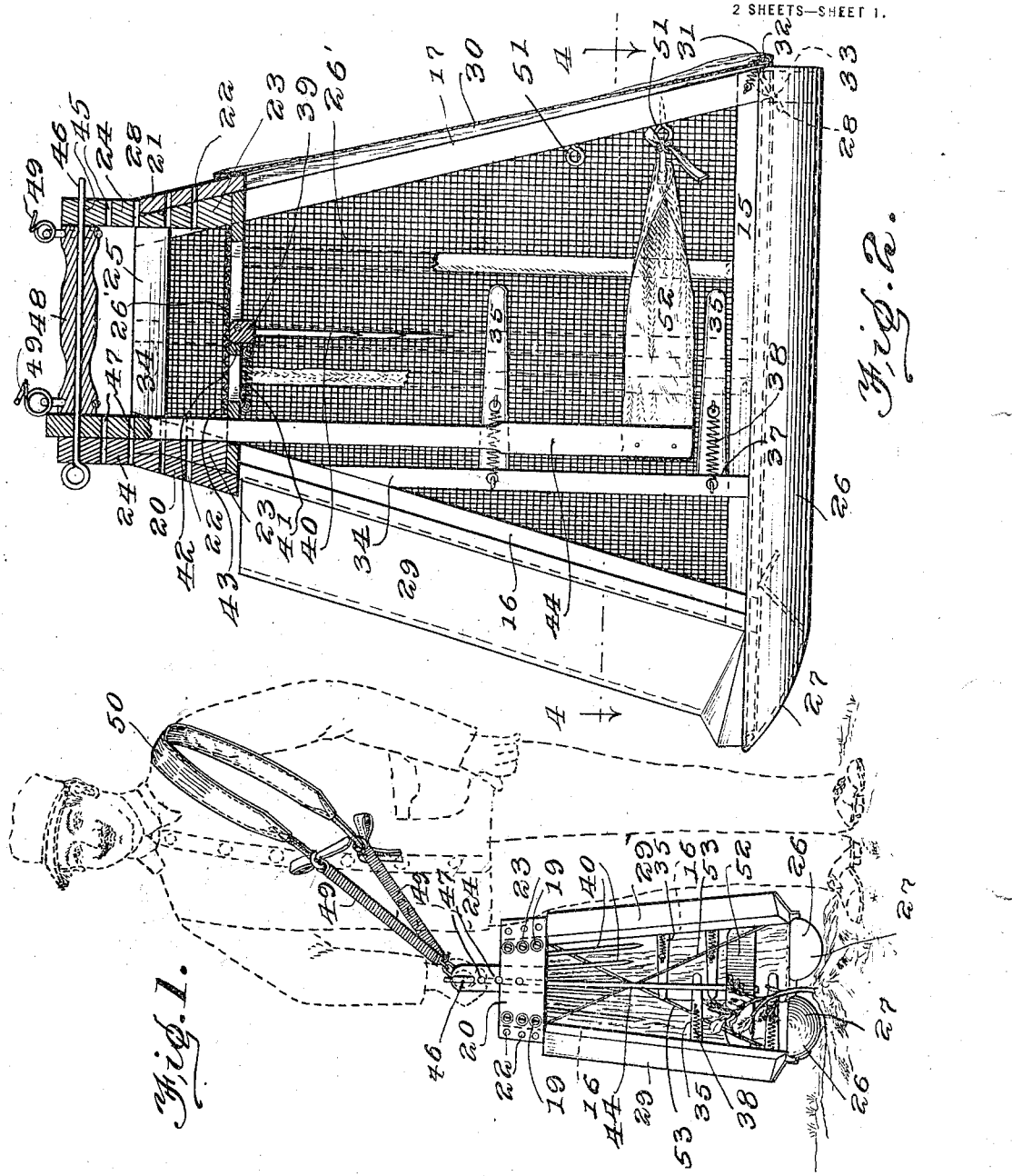

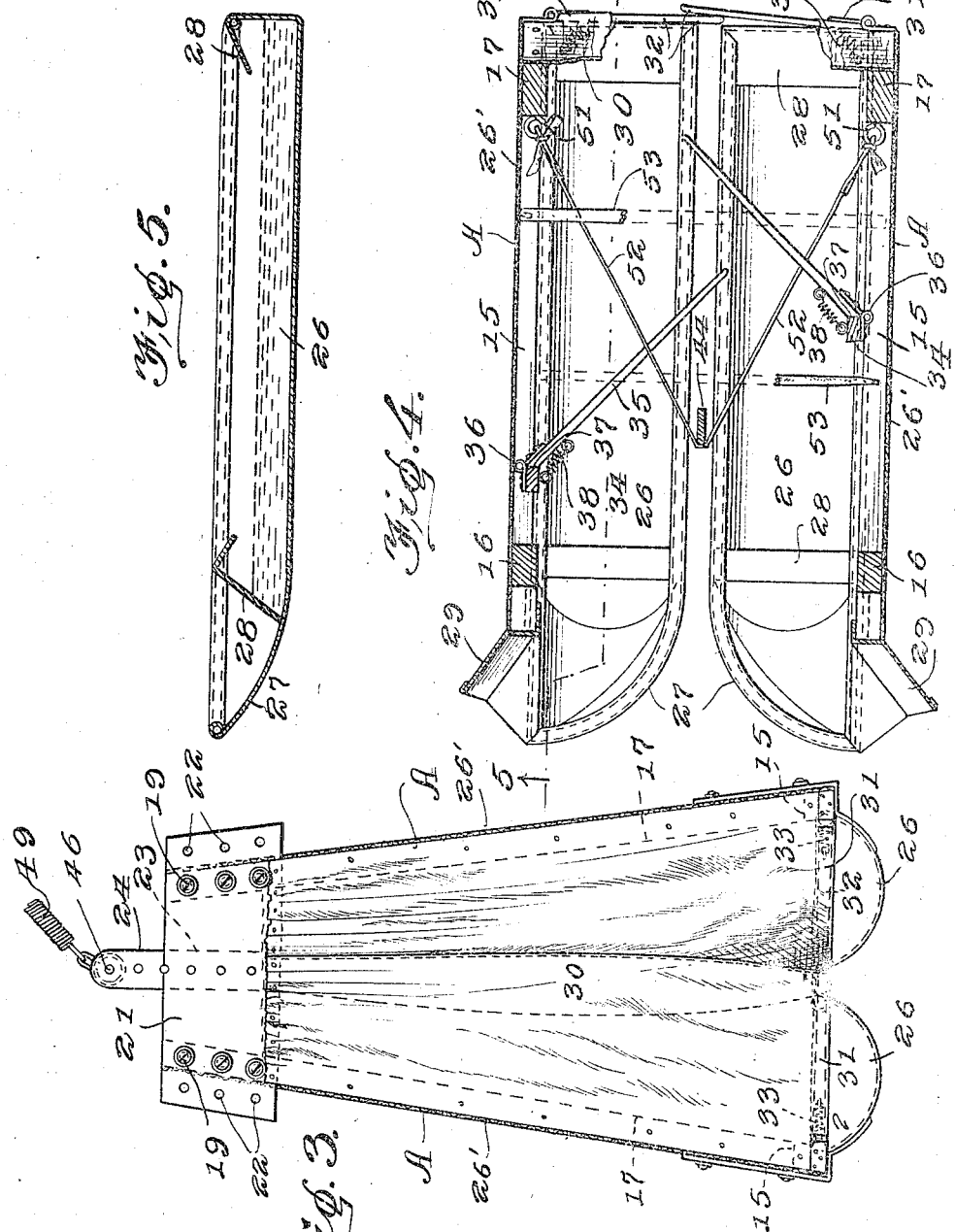

GEORGE E. KYSER, OF BIRMINGHAM, AND JIMIE U. TILL, OF McWILLIAMS, ALABAMA, ASSIGNORS TO TILL MANUFACTURING CO., OF BIRMINGHAM, ALABAMA, A CORPORATION OF ALABAMA.

DEVICE FOR CATCHING BOLL-WEEVILS.

1,240,736.  Specification of Letters Patent.  Patented Sept. 18, 1917.

Application filed March 27, 1917. Serial No. 157,714.

*To all whom it may concern:*

Be it known that we, GEORGE E. KYSER, residing at Birmingham, in the county of Jefferson and State of Alabama, and JIMIE U. TILL, residing at McWilliams, in the county of Wilcox and State of Alabama, both citizens of the United States, have invented new and useful Improvements in Devices for Catching Boll-Weevils, of which the following is a specification.

This invention relates to devices for catching boll weevils and for destroying the same.

The prime object of this invention is to produce a light, simple and inexpensive device of improved construction which may be readily carried and manipulated by the operator and which may be sucessfully employed for the purpose of gathering boll weevils infesting young and tender plants as well as for operating upon plants at a later stage of growth.

A further object of the invention is to produce a simple and improved device of the class described which, by making certain minor changes and adjustments, may be adapted to operate successfully on plants at various stages of their growth for the purpose of gathering and removing the boll weevils infesting the same as well as for detaching and gathering infested leaves, punctured squares and the like.

Further objects of the invention are to simplify and improve the construction and arrangement of the detailed parts of the invention.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a view in front elevation of a device constructed in accordance with the invention, showing how the same is carried by the operator.

Fig. 2 is a longitudinal vertical sectional view of the device.

Fig. 3 is a rear elevation.

Fig. 4 is a horizontal sectional view.

Fig. 5 is a longitudinal vertical sectional view of one of the troughs containing insecticide liquid.

The improved device may be described as consisting of a cage or casing adapted for the passage lengthwise therethrough of the plants that are to be operated upon, said cage being provided with troughs containing insecticide liquid, and with plant engaging beaters whereby the weevils and infested portions will be detached and caused to drop into the troughs, said cage being provided with an adjustable handle whereby it may be conveniently manipulated, and with a sling or brace whereby the weight of the device may be transferred to the shoulder of the operator. In the form of the invention illustrated in the accompanying drawings the cage is shown as being constructed of side frames A each including a bottom member 15, upwardly converging front and rear side members 16 and 17 and a top member 18. These side members, which may be described as being of trapezoidal shape, are arranged in upwardly convergent relation, their upper ends being secured by means of fastening devices such as screws 19 on front and rear top members 20, 21, said top members being of ample width to permit the side frame to be variously spaced apart to which end the said top members are provided with auxiliary apertures 22 for the passage of the fastening members 19. One provision is thus made for adapting the device to operate successfully on plants at various stages of growth. The front and rear top members 20, 21 are each provided with a reinforcing brace 23 intermediate the ends thereof, said reinforcing braces being extended upwardly to form lugs or ears 24. Extending between the top pieces 20, 21 and side frames A, A and secured in any convenient manner on the said top pieces is a top frame 25, said top frame as well as the side frames A, A being covered with suitable material such as wire fabric 26' forming the sides and top of the cage.

Suitably connected with the side frames A, A at the lower ends thereof are the longitudinally disposed gathering troughs 26 which are spaced apart as clearly seen in Figs. 1, 3 and 4 of the drawings to permit the passage of plants therebetween, the distance between the troughs being governed by the distance at which the side frames are spaced apart by the top pieces 20, 21. The gathering troughs are rounded or beveled at their front ends as seen at 27, and they are provided with guards or deflectors 28 to prevent the liability of spilling the insecticide liquid, usually consisting of crude oil, which is placed therein. It is of course to be understood that any liquid suitable for the purpose may be used.

Secured on the front members 16 of the frame are forward divergent deflectors 29 which may be made of sheet metal or other suitable material, said deflectors being for the purpose of gathering the plants and to facilitate their entrance between the side frames A without injury to the plants and without giving the weevils an opportunity to escape.

The space between the rearward ends of the side frames A is obstructed by curtains 30 of flexible, preferably textile, material, said curtains being secured at their upper ends to the rear top piece 21 and at their outer side edges to the rear members 17 of the frames A. The inner edges of the curtains may be permitted to overlap as best seen in Fig. 4 and the lower end edges of the curtains are preferably provided with hems 31 for the reception of arms 32 which are hingedly connected with the lower ends of the frames A and the free ends of which are actuated in a forward direction by springs 33, the forward movement of the free ends of said arms being limited by contact with the rearward ends of the troughs 26. The tension of the springs 33 should be merely sufficient to normally maintain the curtains in closed or obstructing position with respect to the interior of the cage but not to any other material resistance to the free passage of plants between the said curtains.

The side frames A are each provided with an upright bar 34 intermediate the front and rear ends thereof, said bars serving to support arms or beaters 35 which are connected with said bars by hinges 36, each arm 35 being beveled at its inner end to form a shoulder 37 adapted to abut on the bar 34 so as to limit the swinging movement in one direction of said arm. These arms are shown extending obliquely in a rearward direction with respect to the bars 34, so as to present inclined faces lying in the path of plants passing through the cage. Springs 38 are provided for actuating the beater arms to maintain them normally in an oblique position with the shoulders 37 abutting on the bars 34. A rocking bar 39 is pivotally connected with the top frame 25, said bar being provided with downwardly extending beater arms 40 that will lie in the path of the top portions of the plants, the lower ends of the beater arms 40 being actuated in a forward direction by means of a spring 41, and the rocking movement of the bar 39 under the tension of the spring 41 being limited by a stop member 42.

The top frame 25 has a slot 43 in the forward portion thereof for the passage of a vertically disposed bar or member which is designated as the divider 44, said divider extending downwardly between the side frames A, A and about midway therebetween, the lower end of said divider terminating a short distance above the troughs 26. The front and rear top pieces 20, 21 and the braces 23 connected therewith are provided with longitudinal apertures 45 for the passage of a rod 46, and the divider 44 is provided with similar apertures 47 for the passage of said rod, the latter thus serving to secure the divider at various vertical adjustments according to the apertures 45 and 47 engaged thereby. The rod 46 also passes axially through a handle 48 which extends longitudinally between the lugs 24 formed by the braces 23, the front end of said handle abutting on the rear face of the divider which latter is thereby braced and secured against tilting movement with respect to the slot 43. Connected with the handle 48 adjacent to the ends thereof are the lower ends of springs 49 the upper ends of which are connected together by a suitably constructed sling or shoulder strap 50 which is adjusted over the shoulder of the operator as clearly seen in Fig. 1, thus enabling the device which is supported by the springs to be carried, shaken and manipulated with perfect ease, the springs 49 especially enabling the operator to raise or lower the cage-like device according to the condition of the plants and inequalities in the ground, the device being also swung or adjusted with perfect ease so as to enable plants, young and otherwise, to be engaged to the best advantage as seen by the operator.

The rear bars 17 of the side frames A are each provided with a series of screw eyes 51 adapted for convenient connection therewith of the rearward ends of a deflecting member 52, the same consisting preferably of a strip or ribbon of textile material the intermediate portion of which is supported by simply passing it over the lower end of the divider 44 after which the ends thereof are connected with the screw eyes in any convenient manner so as to maintain it reasonably taut and in sufficient frictional engagement with the divider to maintain it in position. The deflector 52, as will be best seen by reference to Fig. 4 presents a V-shaped appearance, the apex thereof being supported by the divider 44 about midway between the side frames A, A. When quite young and tender plants are to be operated upon they will be guided between the side portions of the deflector 52 and the obliquely and rearwardly extending beater arms 35, passing to either side of the apex of the deflector 52 with a much more effective and satisfactory result than if permitted to pass directly between the beater arms 35. Other deflectors 53 consisting of strips or ribbons of textile material may be connected at their upper and lower ends with the upper and lower ends of the opposite side frames, so as to extend diagonally across the cage or structure of the device as clearly seen in Fig. 1. These deflectors, when used, will serve to bring the plants into more intermediate engagement with the beaters than would otherwise be possible. It is desired to be understood, however, that the deflectors 52 and 53 as well as the divider 44 are to be utilized, as a rule, only when young and tender plants are to be operated upon by the device. When plants of mature growth are to be operated upon the divider 44 and the deflectors 52 and 53 are preferably detatched although the deflectors 53 may sometimes be permitted to remain in position.

From the foregoing description, taken in connection with the drawings hereto annexed, the operation and advantages of this invention will be readily understood by those skilled in the art to which it appertains. The majority of machines in present use for catching and destroying boll weevils are adapted for operating only on plants that have reached a mature stage of growth. In other words, the weevils are not gathered until the crop has been seriously injured or destroyed. By the present invention it is intended to provide an apparatus that is particularly designed and adapted for operating on young and tender plants, gathering and destroying the boll weevils before the plants have been seriously injured. It is with this end in view that we provide for the device being carried by the operator in a position where he can manipulate and use it to the best possible advantage without danger of injuring or destroying the young and tender plants. This is a result which can not well be accomplished with machines that are mounted on wheels and either pushed or drawn by the operator or by animal power. By the present invention a bug catching device has been provided which is adapted to be carried by the operator in a raised position with respect to the ground and to the plants that are to be operated upon, said device having a carrying device including a shoulder strap and springs, the latter being sufficiently powerful to support the device in a raised position. The operator will thus be enabled to push the cage of the device downward against the tension of the springs to a plant engaging position while, when not in active use the device will be supported in a raised position by the action of the springs. The present device is so light in construction that it may be very easily carried and operated to the best advantage. The peculiar shape of the cage of this device, with its upwardly converging side walls, contributes greatly to this result, it being readily seen that while ample room is afforded in the lower end of the cage for the gathering troughs, the side walls, being upwardly converged, will not inconvenience the operator or compel him to support it outwardly from his side or with respect to his limbs which could not fail to be wearisome. The weevils and infested materials that drop into the gathering troughs may be subsequently destroyed in any preferred manner.

Having thus described the invention, what is claimed as new is:

1. In a device of the class described, a cage comprising upwardly convergent side frames, front and rear top pieces with which said side frames are connected, and a top frame interposed between the side frames and the front and rear top pieces, said top frame having a spring actuated rocking bar provided with downwardly extending beaters.

2. In a device of the class described, a cage comprising upwardly convergent side frames, front and rear top pieces with which said side frames are connected, and a top frame interposed between the side frames and the front and rear top pieces, said top frame having a spring actuated rocking bar provided with downwardly extending beaters, and said side frames having upright bars, beaters hingedly connected with said bars and having limiting shoulders abutting thereon, and actuating springs for said beaters.

3. In a device of the class described, a cage comprising upwardly convergent side frames, front and rear top pieces with which said side frames are connected, a top frame, beaters connected with the side and top frames, a divider extending through the top frame, means for securing the divider at various vertical adjustments, and a flexible V-shaped deflector having its apex supported on the divider and its ends connected with the side frames.

4. In a device of the class described, a cage comprising upwardly convergent side frames, front and rear top pieces with which said side frames are connected, a top frame, vertical braces on the inner faces of the front and rear top pieces, said braces being extended upwardly to form lugs, and said front and rear top pieces and braces having longitudinal apertures, a divider extending through the top frame, a connecting rod extending through the apertured top pieces and braces and through the divider, and a handle axially engaged by the rod and extending between the divider and the braces on the rearward top piece.

5. In a device of the class described, a cage comprising upwardly convergent side frames, front and rear top pieces with which said side frames are connected, a top frame, vertical braces on the inner faces of the front and rear top pieces, said braces being extended upwardly to form lugs, and said front and rear top pieces and braces having longitudinal apertures, a divider extending through the top frame, a connecting rod extending through the apertured top pieces and braces and through the divider, and a handle axially engaged by the rod and extending between the divider and the braces on the rearward top piece, in combination with suitably arranged spring actuated beaters within the cage.

6. In a device of the class described, a cage-like structure comprising top and side frames and interiorly arranged beaters, divergent wings connected with the front portions of the side frames, overlapping flexible curtains connected with the rear portions of the side frames and having their upper portions also connected with the top portion of the cage, in combination with spring actuated arms with which the lower end portions of the flexible curtains are connected to maintain said curtains normally in obstructing position with respect to the interior of the cage.

7. In a device of the class described, a cage-like structure comprising top and side frames and interiorly arranged beaters, divergent wings connected with the front portions of the side frames, overlapping flexible curtains connected with the rear portions of the side frames and having their upper portions also connected with the top portion of the cage, in combination with spring actuated arms with which the lower end portions of the flexible curtains are connected to maintain said curtains normally in obstructing position with respect to the interior of the cage, and gathering troughs carried by the lower ends of the side frames, the rearward ends of said troughs lying in the path of the spring actuated arms to limit the forward movement thereof.

8. In a device of the class described, a cage-like structure having upwardly convergent side frames, interiorly arranged beaters, divergent wings connected with the forward portions of the side frames, flexible curtains arranged to obstruct the space between the rearward ends of the side frames, and flexible deflecting means arranged and supported between the side frames for cooperation with the beaters.

9. In a device of the class described, a cage-like structure having upwardly convergent side frames, interiorly arranged beaters, divergent wings connected with the forward portions of the side frames, flexible curtains arranged to obstruct the space between the rearward ends of the side frames, and flexible deflecting means arranged and supported between the side frames for cooperation with the beaters, in combination with a handle adjustably connected with the device and carrying means including a shoulder strap and springs whereby the ends of said shoulder strap are connected with the handle.

10. In a device of the class described, a cage comprising upwardly convergent side frames, front and rear top pieces with which said side frames are connected, a longitudinally disposed handle at the top of the cage, and a carrying device including a shoulder strap and springs whereby the ends of said shoulder strap are connected with the handle.

11. In a device of the class described, a cage comprising upwardly convergent side frames, front and rear top pieces with which said frames are connected, a longitudinally disposed handle extending between said front and rear top pieces and connected therewith, and a carrying device including a shoulder strap and springs whereby the ends of said shoulder strap are connected with the handle.

12. In a device of the class described, a cage having upwardly convergent side frames, front and rear top pieces with which the side frames are connected, said top pieces having vertical series of apertures, a handle extending longitudinally between the front and rear top pieces, a pin extending through the top pieces and the handle adjustably connecting the handle with said top pieces, and a carrying device including a shoulder strap and springs connecting the ends of said shoulder strap with the handle.

13. In a device of the class described, a cage having side members connected at their upper ends and spaced apart at their lower ends, said side members being provided with troughs adjacent to their lower ends and with interiorly arranged beaters, in combination with a deflecting element arranged obliquely within the cage to deflect plants to one side, said deflecting element being terminally connected with the two side members of the cage.

In testimony whereof we affix our signatures.

GEORGE E. KYSER.
JIMIE U. TILL.